US012654712B2

(12) United States Patent
Yamada et al.

(10) Patent No.: US 12,654,712 B2
(45) Date of Patent: Jun. 16, 2026

(54) INFORMATION PROCESSING DEVICE, VEHICLE, AND INFORMATION PROCESSING SYSTEM

(71) Applicant: TOYOTA JIDOSHA KABUSHIKI KAISHA, Toyota (JP)

(72) Inventors: Yoshihisa Yamada, Nagoya (JP); Taro Kawai, Toyota (JP); Shoji Kubota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 18/229,943

(22) Filed: Aug. 3, 2023

(65) Prior Publication Data
US 2024/0101125 A1 Mar. 28, 2024

(30) Foreign Application Priority Data
Sep. 27, 2022 (JP) ................................. 2022-153595

(51) Int. Cl.
*B60W 40/09* (2012.01)
*B60W 30/095* (2012.01)
(52) U.S. Cl.
CPC ........ *B60W 40/09* (2013.01); *B60W 30/0956* (2013.01); *B60W 2554/80* (2020.02); *B60W 2556/45* (2020.02)
(58) Field of Classification Search
CPC ............. B60W 40/09; B60W 30/0956; B60W 2554/80; B60W 2556/45; B60W 2050/0029; B60W 2520/10; B60W 2540/12; B60W 2554/802; B60W 2756/10
See application file for complete search history.

(56) References Cited

U.S. PATENT DOCUMENTS

| | | | |
|---|---|---|---|
| 6,679,702 B1 * | 1/2004 | Rau ........................... | G09B 9/02 434/62 |
| RE47,986 E * | 5/2020 | Hubbard .............. | G08G 1/0104 |
| 2007/0032929 A1 * | 2/2007 | Yoshioka ............... | G07C 5/085 701/1 |
| 2012/0101855 A1 * | 4/2012 | Collins .................. | G06Q 40/08 705/4 |

(Continued)

FOREIGN PATENT DOCUMENTS

| | | | |
|---|---|---|---|
| EP | 3683623 A1 * | 7/2020 | ............. B60K 28/02 |
| JP | 2009-070145 A | 4/2009 | |

(Continued)

OTHER PUBLICATIONS

Tomita.*

(Continued)

*Primary Examiner* — Daniel M. Robert
(74) *Attorney, Agent, or Firm* — Oliff PLC

(57) ABSTRACT

An information processing device calculates a feature related to driving of a driver. The information processing device includes: a processor that calculates the feature; and a transmission unit that transmits the calculated feature to an outside. The processor identifies whether there is a predetermined situation in which a risk in relation to a preceding vehicle occurs, and calculates, as the feature, information related to a behavior of the driver for reducing the risk when the predetermined situation is identified.

7 Claims, 3 Drawing Sheets

(56) References Cited

U.S. PATENT DOCUMENTS

| | | | |
|---|---|---|---|
| 2012/0123806 A1* | 5/2012 | Schumann, Jr. | G06Q 40/08 |
| | | | 705/4 |
| 2012/0232741 A1 | 9/2012 | Sekiyama et al. | |
| 2013/0141249 A1* | 6/2013 | Pearlman | H04Q 9/00 |
| | | | 340/870.03 |
| 2016/0114807 A1* | 4/2016 | Phelan | G08G 1/20 |
| | | | 701/70 |
| 2017/0057492 A1* | 3/2017 | Edgington | B60K 28/066 |
| 2017/0287233 A1* | 10/2017 | Nix | G08G 1/166 |
| 2019/0034857 A1* | 1/2019 | Ferguson | G07C 9/00896 |
| 2019/0213429 A1* | 7/2019 | Sicconi | G06F 3/012 |
| 2020/0207212 A1* | 7/2020 | Yoshida | B60W 30/16 |
| 2022/0063607 A1* | 3/2022 | Daniel | B60W 10/04 |
| 2022/0188624 A1* | 6/2022 | Kuehnle | G06F 11/3438 |
| 2022/0258735 A1* | 8/2022 | Ferson | B60W 30/16 |
| 2024/0025404 A1* | 1/2024 | Gupta | G06N 7/01 |

FOREIGN PATENT DOCUMENTS

| | | | |
|---|---|---|---|
| JP | 2016004495 A | * | 1/2016 |
| JP | 2023-075502 A | | 5/2023 |
| JP | 2023-082863 A | | 6/2023 |
| WO | 2011033840 A1 | | 3/2011 |

OTHER PUBLICATIONS

Hosokawa.*
Fujise.*
U.S. Appl. No. 18/214,872, filed Jun. 27, 2023 in the name of Yoshihisa Yamada et al.
U.S. Appl. No. 18/215,932, filed Jun. 29, 2023 in the name of Yoshihisa Yamada et al.

* cited by examiner

INPUT

OUTPUT

INTER-VEHICLE TIME $\Rightarrow$ SECOND PROCESSING UNIT /24 $\Rightarrow$ SCENE IDENTIFICATION SIGNAL FEATURE TIME

INPUT

OUTPUT

SCENE IDENTIFICATION SIGNAL FEATURE TIME $\Rightarrow$ THIRD PROCESSING UNIT /26 $\Rightarrow$ ANONYMIZATION OF FEATURE DETECTION OF CHANGE IN FEATURE

INFORMATION PROCESSING DEVICE, VEHICLE, AND INFORMATION PROCESSING SYSTEM

CROSS-REFERENCE TO RELATED APPLICATION

This application claims priority to Japanese Patent Application No. 2022-153595 filed on Sep. 27, 2022, incorporated herein by reference in its entirety.

BACKGROUND

1. Technical Field

This disclosure relates to an information processing device, a vehicle, and an information processing system, and particularly relates to an information processing device that calculates features related to driving of a driver, a vehicle including the information processing device, and an information processing system including the vehicle and a server.

2. Description of Related Art

There is a vehicle driving evaluation device that measures a driving behavior index when a specific driving scene is detected and that calculates a risk index based on the driving behavior index (see, for example, Japanese Unexamined Patent Application Publication No. 2009-070145 (JP 2009-070145 A)).

SUMMARY

It is desirable to evaluate the driving of the driver when risks arise in relation to the preceding vehicle.

This disclosure provides an information processing device, a vehicle, an information processing system, an information processing method, and a storage medium capable of evaluating the driving of a driver when a risk occurs in relation to a preceding vehicle.

An information processing device according to this disclosure is configured to calculate a feature related to driving of a driver. The information processing device includes: one or more processors configured to calculate the feature; and a transmission unit configured to transmit the calculated feature to an outside. The one or more processors are configured to identify whether there is a predetermined situation in which a risk in relation to a preceding vehicle occurs, and calculate, as the feature, information related to a behavior of the driver for reducing the risk when the predetermined situation is identified.

With such a configuration, when a predetermined situation in which a risk occurs in relation to the preceding vehicle is identified, information related to the behavior of the driver for reducing the risk is calculated as the feature, and the feature is transmitted to the outside. As a result, it is possible to provide an information processing device capable of evaluating the driving of the driver when a risk occurs in relation to the preceding vehicle.

The predetermined situation may be a situation in which an inter-vehicle time obtained by dividing an inter-vehicle distance from the preceding vehicle by a velocity related to a host vehicle is smaller than a predetermined time.

With such a configuration, when a situation in which the inter-vehicle time obtained by dividing the inter-vehicle distance from the preceding vehicle by the velocity related to the host vehicle is shorter than a predetermined time is identified, information related to the behavior of the driver for reducing the risk is calculated as the feature, and the feature is transmitted to the outside. As a result, the driving of the driver can be evaluated when a risk occurs in relation to the preceding vehicle.

The information related to the behavior of the driver for reducing the risk may be information related to braking operation.

With such a configuration, when a predetermined situation in which a risk occurs in relation to the preceding vehicle is identified, information related to the braking operation is calculated as the feature, and the feature is transmitted to the outside. As a result, the driving of the driver can be evaluated when a risk occurs in relation to the preceding vehicle.

The information related to the braking operation may be information related to a sensor value related to the braking operation. With such a configuration, when a predetermined situation in which a risk occurs in relation to the preceding vehicle is identified, information related to the sensor value related to the braking operation is calculated as the feature, and the feature is transmitted to the outside. As a result, the driving of the driver can be evaluated when a risk occurs in relation to the preceding vehicle.

The one or more processors may be configured to calculate, as the feature, information related to a frequency with which the behavior of the driver for reducing the risk has been performed in the predetermined situation.

With such a configuration, when a predetermined situation in which a risk occurs in relation to the preceding vehicle is identified, information related to the number of times the behavior of the driver for reducing the risk has been performed in the predetermined situation is calculated as the feature, and the feature is transmitted to the outside. As a result, the driving of the driver can be evaluated when a risk occurs in relation to the preceding vehicle.

The one or more processors may be configured to calculate, as the feature, information related to a difference between the behavior of the driver for reducing the risk and a predetermined model behavior.

With such a configuration, when a predetermined situation in which a risk occurs in relation to the preceding vehicle is identified, information related to the difference between the behavior of the driver for reducing the risk and the model behavior is calculated as the feature, and the feature is transmitted to the outside. As a result, the driving of the driver can be evaluated when a risk occurs in relation to the preceding vehicle.

According to another aspect of this disclosure, a vehicle includes an information processing device configured to calculate a feature related to driving of a driver. The information processing device includes: one or more processors configured to calculate the feature; and a transmission unit configured to transmit the calculated feature to an outside. The one or more processors are configured to identify whether there is a predetermined situation in which a risk in relation to a preceding vehicle occurs, and calculate, as the feature, information related to a behavior of the driver for reducing the risk when the predetermined situation is identified.

With such a configuration, it is possible to provide a vehicle capable of evaluating the driving of the driver when a risk occurs in relation to the preceding vehicle.

According to still another aspect of this disclosure, an information processing system includes a vehicle and a server. The vehicle includes an information processing device configured to calculate a feature related to driving of a driver. The information processing device includes: one or more processors configured to calculate the feature; and a transmission unit configured to transmit the calculated feature to the server. The one or more processors are configured to identify whether there is a predetermined situation in which a risk in relation to a preceding vehicle occurs, and calculate, as the feature, information related to a behavior of the driver for reducing the risk when the predetermined situation is identified. The server is configured to execute a predetermined process on the feature.

With such a configuration, it is possible to provide an information processing system capable of evaluating the driving of the driver when a risk occurs in relation to the preceding vehicle.

According to still another aspect of this disclosure, an information processing method is executed by an information processing device that calculates a feature related to driving of a driver. The information processing device includes one or more processors that calculate the feature, and a transmission unit that transmits the calculated feature to an outside. The information processing method includes: identifying, by the one or more processors, whether there is a predetermined situation in which a risk in relation to a preceding vehicle occurs; and calculating, as the feature, by the one or more processors, information related to a behavior of the driver for reducing the risk when the predetermined situation is identified.

With such a configuration, it is possible to provide an information processing method capable of evaluating the driving of the driver when a risk occurs in relation to the preceding vehicle.

According to still another aspect of this disclosure, a non-transitory storage medium stores instructions executable by one or more processors of an information processing device that calculates a feature related to driving of a driver. The information processing device includes the one or more processors that calculate the feature, and a transmission unit that transmits the calculated feature to an outside. The instructions cause the one or more processors to execute functions including: identifying whether there is a predetermined situation in which a risk in relation to a preceding vehicle occurs; and calculating, as the feature, information related to a behavior of the driver for reducing the risk when the predetermined situation is identified.

With such a configuration, it is possible to provide a storage medium capable of evaluating the driving of the driver when a risk occurs in relation to the preceding vehicle.

This disclosure can provide an information processing device, a vehicle, an information processing system, an information processing method, and a storage medium capable of evaluating the driving of a driver when a risk occurs in relation to a preceding vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
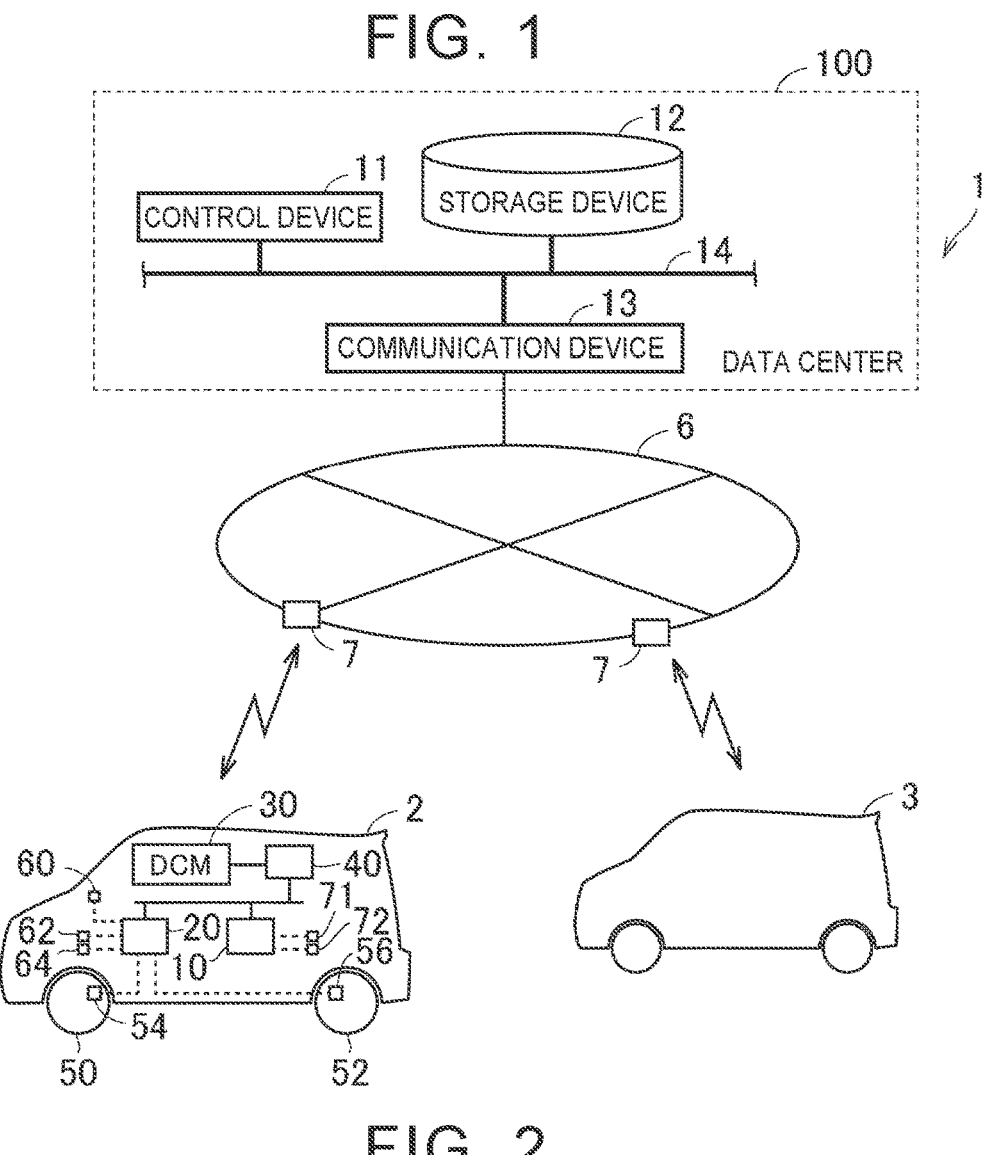
FIG. 1 illustrates an example of a configuration of a vehicle information management system.

Hereinafter, embodiments of the present disclosure will be described in detail with reference to the drawings. The same or corresponding parts in the drawings are denoted by the same reference signs, and the description thereof will not be repeated.

FIG. 1 illustrates an example of the configuration of a vehicle information management system 1. As shown in FIG. 1, in the present embodiment, the vehicle information management system 1 includes a plurality of vehicles 2, 3, a communication network 6, base stations 7, and a data center 100.

The vehicles 2, 3 may be any vehicles capable of communicating with the data center 100. For example, the vehicles 2, 3 may be vehicles using an engine as a driving source, battery electric vehicles using an electric motor as a driving source, or hybrid electric vehicles equipped with an engine and an electric motor and using either or both of the engine and the electric motor as a driving source. Although FIG. 1 shows only two vehicles 2, 3 for convenience of description, the number of vehicles is not particularly limited to two, and may be three or more.

The vehicle information management system 1 is configured to acquire predetermined information from the vehicles 2, 3 configured to communicate with the data center 100, and manage the acquired information.

The data center 100 includes a control device 11, a storage device 12, and a communication device 13. The control device 11, the storage device 12, and the communication device 13 are connected to each other via a communication bus 14 so that these devices 11, 12, and 13 can communicate with each other.

Although not shown in the figure, the control device 11 includes a central processing unit (CPU), a memory (such as a read-only memory (ROM) and a random access memory (RAM)), and an input and output port for inputting and outputting various signals. Various controls that are performed by the control device 11 are implemented by software processing, that is, by the CPU reading a program stored in the memory. The various controls that are performed by the control device 11 can also be implemented by a general-purpose server (not shown) executing a program stored in a storage medium. However, the various controls that are performed by the control device 11 need not necessarily be implemented by the software processing, and may be implemented by processing with dedicated hardware (electronic circuit).

The storage device 12 stores predetermined information on the vehicles 2, 3 configured to communicate with the data center 100. The predetermined information includes, for example, information on a feature of each vehicle 2, 3 that will be described later, and information identifying each vehicle 2, 3 (hereinafter referred to as vehicle identification (ID)). The vehicle ID is unique information set for each vehicle. The data center 100 can identify a sender vehicle by the vehicle ID.

The communication device 13 implements bidirectional communication between the control device 11 and the communication network 6. The data center 100 can communicate with a plurality of vehicles including the vehicles 2, 3 via the base stations 7 on the communication network 6 by using the communication device 13.

Next, a specific configuration of the vehicles 2, 3 will be described. Since the vehicles 2, 3 basically have the same configuration, the configuration of the vehicle 2 will be representatively described below.

The vehicle 2 includes drive wheels 50 and driven wheels 52. When the drive wheels 50 are rotated by the operation of the driving source, a driving force acts on the vehicle 2 and the vehicle 2 moves accordingly.

The vehicle 2 further includes an advanced driver assistance system-electronic control unit (ADAS-ECU) 10, a brake ECU 20, a Data Communication Module (DCM) 30, and a central ECU 40.

Each of the ADAS-ECU 10, the brake ECU 20, and the central ECU 40 is a computer including a processor such as a CPU that executes a program, a memory, and an input and output interface.

The ADAS-ECU 10 includes a driver assistance system having functions related to driver assistance of the vehicle 2. The driver assistance system is configured to implement various functions to assist in driving of the vehicle 2 including at least one of the following three controls of the vehicle 2 by running an application installed on the driver assistance system: steering control, drive control, and braking control. Examples of the application installed on the driver assistance system include an application that implements functions of an autonomous driving (AD) system, an application that implements functions of an automated parking system, and an application that implements functions of an advanced driver assistance system (ADAS) (hereinafter referred to as the "ADAS application").

For example, the ADAS application includes at least one of the following applications: an application that implements functions of vehicle following driving (adaptive cruise control (ACC) etc.) for maintaining a constant distance to a vehicle ahead, an application that implements functions of an auto speed limiter (ASL) for perceiving a velocity limit and adapting the maximum velocity of the vehicle 2 to the velocity limit, an application that implements functions of lane keeping assistance (lane keeping assist (LKA), lane tracing assist (LTA), etc.) for keeping the vehicle 2 within its lane, an application that implements functions of collision damage reduction braking (autonomous emergency braking (AEB), pre-crash safety (PCS), etc.) for automatically braking the vehicle 2 in order to reduce damage from a collision, and an application that implements functions of lane deviation warning (lane departure warning (LDW), lane departure alert (LDA), etc.) for alerting a driver of the vehicle 2 that the vehicle 2 is deviating from its lane.

Each application on the driver assistance system outputs to the brake ECU a request for a kinematic plan that guarantees the merchantability (functionality) of the application alone, based on information on the vehicle surroundings acquired (input) from a plurality of sensors, an assistance request from the driver, etc. Examples of the sensors include a vision sensor such as a forward-facing camera 71, a millimeter wave radar 72, a light detection and ranging (LiDAR) sensor, and a location detection device.

The forward-facing camera 71 captures a video of a view ahead of the vehicle 2 and sends data of the captured video to the ADAS-ECU 10. The millimeter wave radar 72 is a sensor that measures the distance, velocity, and angle of objects in front of and around the vehicle 2 using radio waves in the millimeter-wave (30 GHz band to 300 GHz band) band, and that sends data of the measured results to the ADAS-ECU 10. A plurality of sensors connected to the ADAS-ECU 10 is not limited to being connected to the ADAS-ECU 10. Any of the sensors may be connected to other ECUs, and the data of the detection results of that sensor may be input to the ADAS-ECU 10 via a communication bus or the central ECU 40.

Each application acquires, as perceived sensor information, information on the vehicle surroundings obtained by integrating the detection results from one or more sensors, and also acquires an assistance request from the driver via a user interface (not shown) such as a switch. For example, each application can perceive other vehicles, obstacles, or persons around the vehicle by processing, using artificial intelligence (AI) or an image processor, images or videos of the vehicle surroundings acquired by the sensors. For example, using data from the forward-facing camera 71 and the millimeter wave radar 72, an inter-vehicle time is calculated from the inter-vehicle distance and the relative velocity between the vehicle 2 and the preceding vehicle by the following formula: inter-vehicle distance/relative velocity=inter-vehicle time.

The kinematic plan includes, for example, a request regarding a longitudinal acceleration or deceleration to be generated on the vehicle 2, a request regarding the steering angle of the vehicle 2, and a request regarding holding the vehicle 2 at a stop.

The brake ECU 20 controls a brake actuator that generates a braking force on the vehicle 2 by using the detection results from the sensors. The brake ECU 20 also sets a motion request for the vehicle 2 that fulfills the requests of the kinematic plan from the ADAS-ECU 10. The motion request for the vehicle 2 set by the brake ECU 20 is fulfilled by an actuator system (not shown) mounted on the vehicle 2. The actuator system includes, for example, a plurality of types of actuator systems such as a powertrain system, a brake system, and a steering system.

For example, a steering angle sensor 60, an accelerator pedal depression amount sensor 62, a brake pedal depression amount sensor 64, a first wheel speed sensor 54, and a second wheel speed sensor 56 are connected to the brake ECU 20.

The steering angle sensor 60 detects the steering angle. The steering angle sensor 60 transmits a signal indicating the detected steering angle to the brake ECU 20.

The accelerator pedal depression amount sensor 62 detects the depression amount of an accelerator pedal (not shown). The accelerator pedal depression amount sensor 62 transmits a signal indicating the detected depression amount of the accelerator pedal to the brake ECU 20.

The brake pedal depression amount sensor 64 detects the depression amount of a brake pedal (not shown). The brake pedal depression amount sensor 64 transmits a signal indicating the detected depression amount of the brake pedal to the brake ECU 20.

The first wheel speed sensor 54 detects the number of rotations (wheel speed) of the drive wheel 50. The first wheel speed sensor 54 transmits a signal indicating the detected number of rotations of the drive wheel 50 to the brake ECU 20.

The second wheel speed sensor 56 detects the number of rotations of the driven wheel 52. The second wheel speed sensor 56 transmits a signal indicating the detected number of rotations of the driven wheel 52 to the brake ECU 20.

The configuration in which the steering angle sensor 60, the accelerator pedal depression amount sensor 62, the brake pedal depression amount sensor 64, the first wheel speed sensor 54, and the second wheel speed sensor 56 are connected to the brake ECU 20 and directly transmit the detection results to the brake ECU 20 is illustrated as an example in FIG. 1. However, any of the sensors may be connected to other ECUs, and the detection results of that sensor may be input to the brake ECU 20 via a communication bus or the central ECU 40.

For example, the brake ECU 20 receives information on the running state of various applications, receives information on other driving operations such as a shift range, and receives information on the behavior of the vehicle 2, in addition to receiving the information on the kinematic plan from the ADAS-ECU 10.

The DCM 30 is a communication module configured to bidirectionally communicate with the data center 100.

The central ECU 40 is configured to communicate with, for example, the brake ECU 20, and is also configured to communicate with the data center 100 using the DCM 30. For example, the central ECU 40 sends information received from the brake ECU to the data center 100 via the DCM 30.

In the present embodiment, the central ECU 40 has been described as an ECU that sends information received from the brake ECU 20 to the data center 100 via the DCM 30. For example, the central ECU 40 may have a function (gateway function) such as relaying communication between various ECUs. Alternatively, the central ECU 40 may include a memory (not shown) whose stored contents can be updated using update information from the data center 100, and may be an ECU from which predetermined information including update information stored in the memory is read by various ECUs when the system of the vehicle 2 is started.

In the vehicle 2 having such a configuration, the brake ECU 20 can, for example, estimate the state of change of the vehicle 2 (e.g., the state of deterioration of parts of the vehicle 2) using information obtained from the sensors mounted on the vehicle 2. However, since the state of the vehicle 2 may change significantly depending on disturbance and how the vehicle 2 is driven, the estimated state of change of the vehicle 2 may include noise caused by the disturbance and how the vehicle 2 is driven. As a result, the state of change of the vehicle 2 sometimes cannot be estimated accurately.

Therefore, in the present embodiment, the brake ECU 20 receives input information including at least one of information related to the driving operation of the vehicle 2, information related to the operating state of the driver assistance of the vehicle 2, and information related to the behavior of the vehicle 2. The brake ECU 20 calculates a feature related to the operation of the vehicle by using the input information received during the period in which the predetermined condition is satisfied out of the period in which the brake ECU 20 receives input information. It is herein assumed that the predetermined condition includes a condition that the driving situation of the vehicle is a predetermined driving situation corresponding to the feature.

Figure 2:
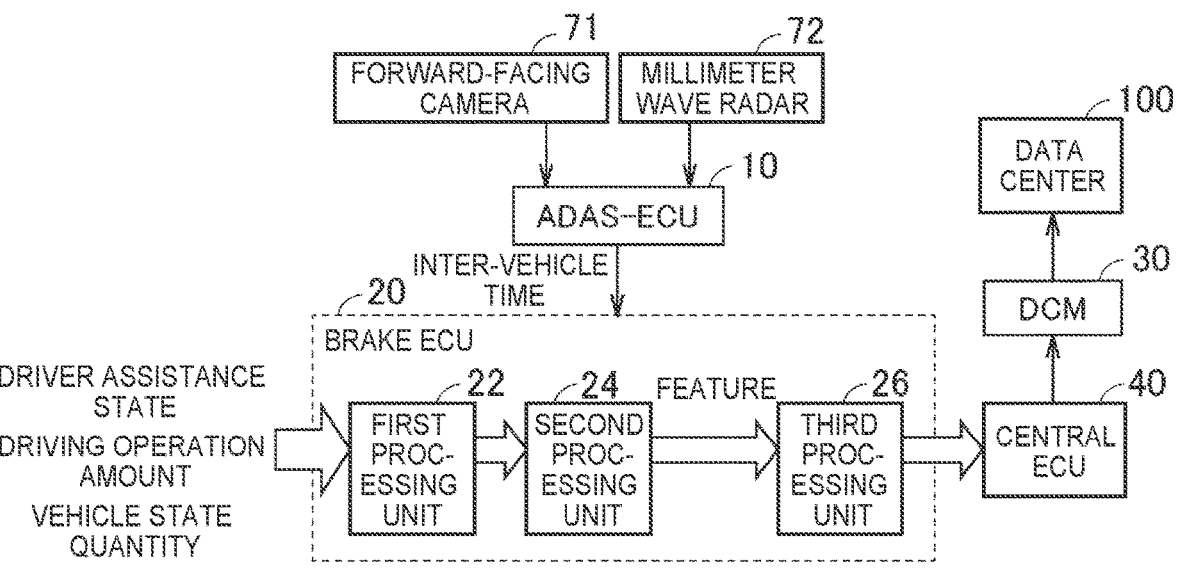
FIG. 2 illustrates a configuration of an example of a vehicle information processing device according to the present embodiment.

The feature can thus be calculated by excluding at least a part of the input information containing noise caused by the disturbance and how the vehicle 2 is driven, as compared to the case where the feature is calculated using the input information received during the entire period in which the brake ECU 20 receives input information. Therefore, the feature related to the operation of the vehicle 2 can be accurately calculated. FIG. 2 illustrates the configuration of an example of a vehicle information processing device according to the present embodiment. The vehicle information processing device according to the present embodiment is implemented by the brake ECU 20.

The brake ECU 20 includes a first processing unit 22, a second processing unit 24, and a third processing unit 26. The first processing unit 22 receives information indicating the depression amount of the accelerator pedal and information indicating the depression amount of the brake pedal as the information on the driving operation performed on the vehicle 2. The first processing unit 22 also receives information indicating requests of a kinematic plan from the ADAS-ECU 10 and the operating state of the driver assistance system (for example, the inter-vehicle time) as the information on the operating state of the driver assistance of the vehicle 2. The first processing unit 22 also receives information indicating the detection results from various sensors as the information on the behavior of the vehicle 2. The first processing unit 22 outputs to the second processing unit 24 input information received during the period in which a predetermined condition is satisfied out of the period in which the first processing unit 22 receives input information.

The second processing unit 24 calculates a feature related to the operation of the vehicle 2 by using the input information received during the period in which the predetermined condition is satisfied out of the period in which the first processing unit 22 receives input information.

Figure 3:
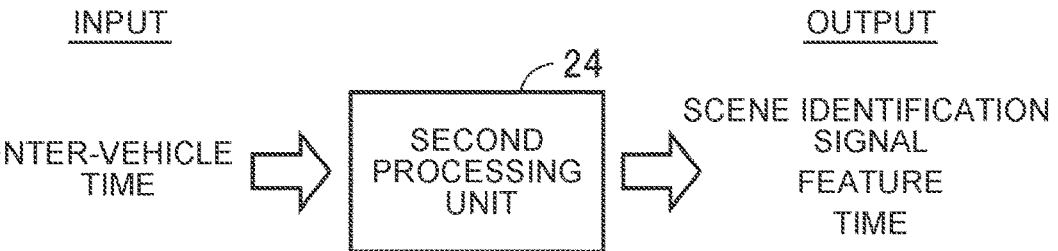
FIG. 3 illustrates an example of a process that is performed by a second processing unit.

FIG. 3 illustrates an example of a process that is performed by the second processing unit 24. As shown in FIG. 3, the inter-vehicle time is input to the second processing unit 24 as the input information. The second processing unit 24 determines whether the predetermined condition is satisfied by using the input information.

The predetermined condition includes a condition that the driving situation of the vehicle 2 is a predetermined driving situation. In the present embodiment, the feature indicates, for example, the behavior for reducing the risk in a scene where the distance between the vehicle 2 and the preceding vehicle is narrow. As the scenes, when the inter-vehicle time is divided into 4 stages of 2 bits as follows: 0b00=an inter-vehicle time of 2.5 seconds or more (meaning a sufficiently long inter-vehicle time), 0b01=an inter-vehicle time of 2.0 seconds or more and less than 2.5 seconds, 0b10=an inter-vehicle time of 1.5 seconds or more and less than 2.0 seconds, and 0b11=an inter-vehicle time of less than 1.5 seconds (meaning a high rear-end collision risk), there is a scene changing from 0b00 to 0b01, a scene changing from 0b01 to 0b10, and a scene changing from 0b10 to 0b11, for example. In the present embodiment, among these scenes, the scene changing from 0b00 to 0b01 is taken as a sampled scene for which the feature is sampled. That is, the condition that the driving situation of the vehicle 2 is a predetermined driving situation is the condition that the driving situation of the vehicle 2 is a sampled scene changing from 0b00 to 0b01. The expected value (=standard model) of the reduction behavior in the scene changing from 0b00 to 0b01 is the foot braking stance (the behavior of placing the foot on the brake pedal), and can be discriminated from whether the brake pedal depression amount sensor 64 detects a very small amount of depression. The expected value (=standard model) of the reduction behavior in the scene changing from 0b01 to 0b10 or in the scene changing from 0b10 to 0b11 can be discriminated from whether the behavior of adjusting the inter-vehicle distance by foot braking is detected (the hydraulic pressure of the brake master cylinder is respectively a first predetermined value or a second predetermined value or more, and the first predetermined value <the second predetermined value holds).

For example, the first feature indicates a personal feature such as the frequency of reduction behavior with respect to the total number of sampled scenes, and is specifically calculated by the following formula: the number of times of reduction behavior per trip/the total number of sampled scenes. The first feature can be used to quantify the unevenness of the driver's behavior, and to estimate the driver's emotion during driving. Further, the second feature indicates an objective feature such as an integrated value of the difference from a skilled driver's model, and is specifically calculated from the difference between the number of times of reduction behavior per trip in the expected value model of the skilled driver/the total number of sampled scenes and the number of times of reduction behavior per trip of the driver/the total number of sampled scenes. This second feature can be used to quantify the driver's proficiency level and to recognize how the driver deals with disturbances from surrounding traffic. The method for calculating the feature is not limited to the above calculation method.

When the second processing unit 24 determines that the predetermined condition is satisfied, the second processing unit 24 sets a flag indicating that the predetermined condition is satisfied. The second processing unit 24 outputs a signal indicating the state of the flag as a scene identification signal.

When the second processing unit 24 determines that the predetermined condition is satisfied, the second processing unit 24 calculates the first feature or the second feature described above by using the input information received during the period in which the predetermined condition is satisfied. For example, when the predetermined condition is satisfied, the second processing unit 24 calculates the first feature or the second feature, and stores (saves) the calculated feature in a memory in such a manner that the calculated feature is associated with time. The second processing unit 24 outputs the first feature or the second feature that has been calculated, together with the scene identification signal and time.

The third processing unit 26 uses the information output from the second processing unit 24 to execute preprocessing for transmitting the information to the central ECU via a controller area network (CAN). As the preprocessing, the third processing unit 26 executes, for example, anonymization of the feature (for example, statistical processing), or detects a change in the feature (for example, whether there is a change from the past trip or a sudden change).

Figure 4:
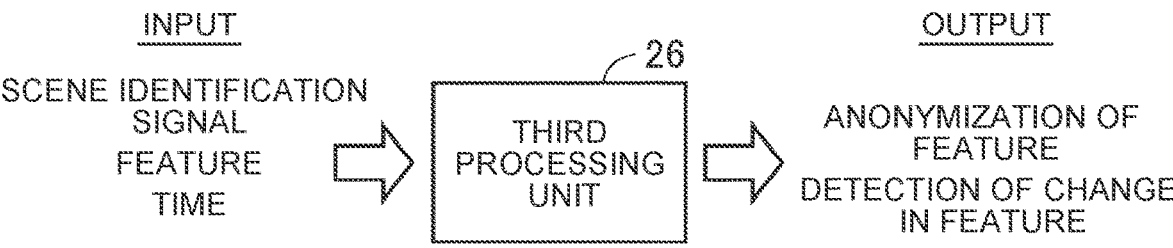
FIG. 4 illustrates an example of a process that is performed by a third processing unit.

FIG. 4 illustrates an example of a process that is performed by the third processing unit 26. As shown in FIG. 4, the third processing unit 26 receives information indicating the scene identification signal, the features, and the times from the second processing unit 24.

The third processing unit 26 outputs information necessary for the data center 100 to determine whether a change history of the feature corresponds to a predetermined state. The third processing unit 26 outputs the generated information to the central ECU 40.

The central ECU 40 sends the information received from the third processing unit 26 to the data center 100 via the DCM 30.

The information sent from the DCM 30 to the data center 100 includes, for example, the processed time, the scene identification number, and the feature (there is a plurality of sets of a scene identification number and a feature). Therefore, the data center 100 stores the information received from the DCM 30 in the storage device 12 in such a manner that the processed times, the scene identification number, and the feature are one set of data. The data center 100 can thus acquire a statistic of a change in the feature and a statistic of a change in driving behavior characteristics of the driver of each vehicle 2, 3 capable of communicating with the data center 100.

Figure 5:
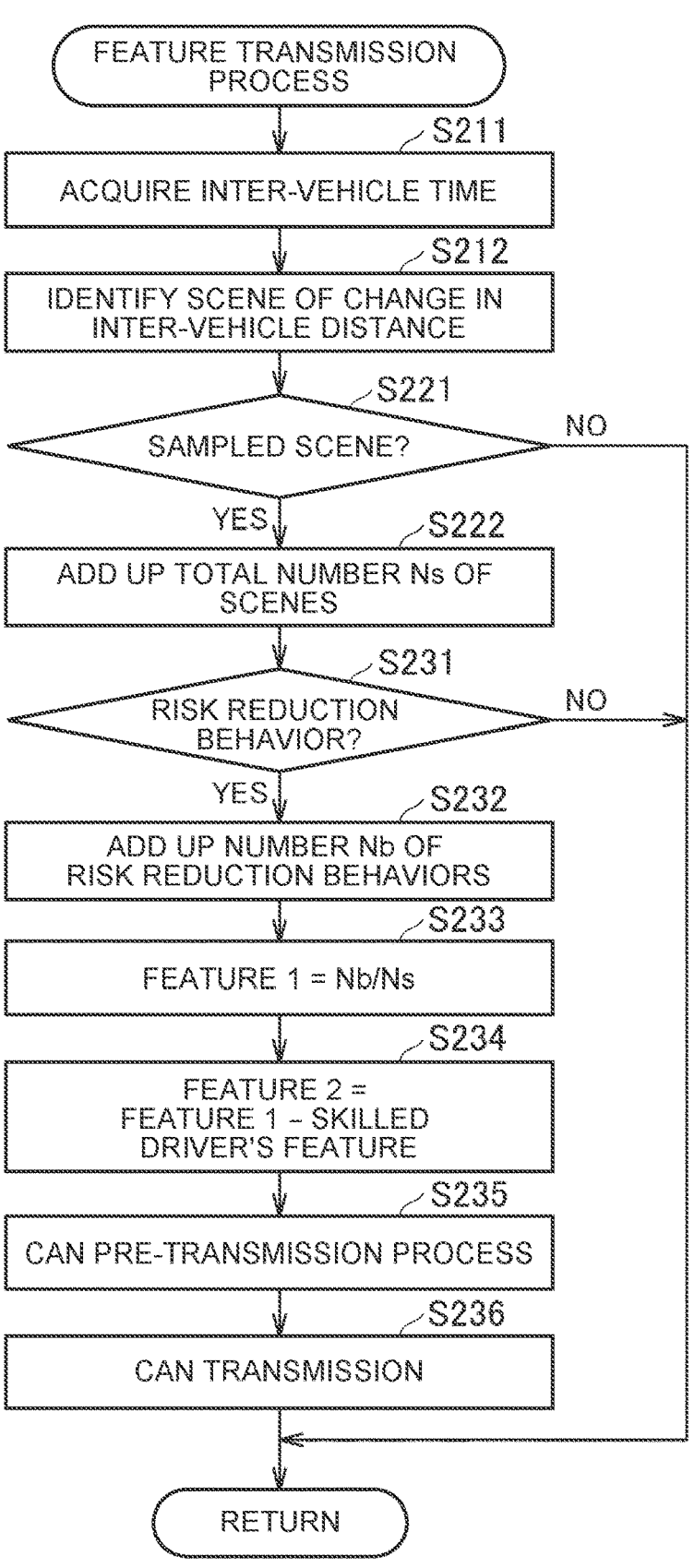
FIG. 5 is a flowchart showing the flow of a feature transmission process executed by a brake ECU.

FIG. 5 is a flowchart showing the flow of a feature transmission process executed by the brake ECU 20. With reference to FIG. 5, this feature transmission process is called and executed at predetermined control intervals from a higher level process.

First, the brake ECU 20 acquires the inter-vehicle time from the ADAS-ECU 10 (step S211). Next, the brake ECU 20 identifies the scene of a change in the inter-vehicle distance from the inter-vehicle time (step S212).

Then, the brake ECU 20 determines whether the scene of a change in the inter-vehicle distance is the sampled scene (the above-described scene changing from 0b00 to 0b01) (step S221). When it is determined that the scene of a change in the inter-vehicle distance is not the sampled scene (NO in step S221), the brake ECU 20 terminates the feature transmission process and returns the process to be executed to the higher level process (the caller).

When it is determined that the scene of a change in the inter-vehicle distance is the sampled scene (YES in step S221), the brake ECU 20 adds up the total number Ns of scenes, that is, adds 1 to the original Ns to set the value as a new Ns (step S222).

Next, the brake ECU 20 determines whether the driver has performed a behavior for reducing the risk (in the present embodiment, a behavior of placing the foot on the brake pedal) (step S231). When it is determined that the driver has not performed a reduction behavior (NO in step S231), the brake ECU 20 terminates the feature transmission process and returns the process to be executed to the higher level process (the caller). On the other hand, when it is determined that the driver has performed a reduction behavior (YES in step S231), the brake ECU 20 adds up the number Nb of risk reduction behaviors, that is, adds 1 to the original Nb to set the value as a new Nb (step S232).

Subsequently, the brake ECU 20 calculates the first feature, that is, feature 1=Nb/Ns (step S233). The second feature, that is, feature 2=feature 1−skilled driver's feature is also calculated (step S234).

When the current time is the time of the end of the current trip, the brake ECU 20 executes anonymization of the feature (for example, statistical processing) as a CAN pre-transmission process (step S235). Specifically, the brake ECU 20 calculates the maximum value, the minimum value, and the standard deviation of Nb/Ns for a predetermined number of past trips (for example, 50 times) for the first feature. When the current Nb/Ns exceeds the preset standard deviation, a sudden change presence/absence flag indicating the degree of change (small population: 0b00, small change: 0b01, sudden increase: 0b10, sudden decrease: 0b11) is set. The second feature is also processed in the same manner as the first feature.

Next, the brake ECU 20 sends the scene identification information, the maximum value, the minimum value, the standard deviation, and the sudden change presence/absence flag of the first feature Nb/Ns and the second feature to the central ECU 40 via the CAN (step S236). The central ECU 40 sends the received information to the data center 100 via the DCM 30. The control device 11 of the data center 100 executes a predetermined process on the first feature and the second feature identified by the received information (for example, a process of storing the first feature and the second feature in the storage device 12 and statistical processing for the first feature and the second feature stored in the storage device 12).

Modification (1) In the above-described embodiment, as shown in steps S235, S236, and the like in FIG. 5, the CAN pre-transmission process and the CAN transmission are executed at the end of the trip. However, the configuration is not limited to this, and the CAN pre-transmission process and the CAN transmission may be executed at other timings, for example, at the start of the next trip or at a predetermined timing during the next trip (for example, after a predetermined time after the ignition is turned on).

(2) In the above-described embodiment, as shown in steps S233 to S236 in FIG. 5, both the first feature and the second feature are calculated and the CAN transmission is executed. However, the configuration is not limited to this, and another third feature may be calculated and the CAN transmission may be executed, or any one or more of these features may be calculated and the CAN transmission may be executed.

(3) In the above-described embodiment, as shown in step S221 in FIG. 5, the sampled scene is one scene changing from 0b00 to 0b01. However, the configuration is not limited to this, and the sampled scene may be another scene, or may be one or more of a plurality of scenes including other scenes.

(4) In the above-described embodiment, the brake ECU 20 executes the process in FIG. 5. However, the configuration is not limited to this, and the process in FIG. 5 may be executed by another information processing device, for example, another ECU of the vehicle 2 or an external information processing device (for example, the data center 100).

(5) The above-described embodiment can be regarded as a disclosure of an information processing device such as the brake ECU 20, can be regarded as a disclosure of vehicles 2, 3 including the information processing device, can be regarded as a disclosure of an information processing system such as the vehicle information management system 1 including the vehicles 2, 3 and a server such as the data center 100, can be regarded as a disclosure of an information processing method executed by the information processing device, and can be regarded as a disclosure of an information processing program executed by the information processing device.

Summary (1) As shown in FIG. 1, the brake ECU 20 is an information processing device that calculates a feature related to driving of a driver, and includes a CPU that calculates the feature and an input/output interface that transmits the calculated feature to the outside. As shown in FIGS. 2 to 5, the CPU of the brake ECU 20 specifies whether there is a predetermined situation (for example, a sampled scene) in which a risk occurs in relation to the preceding vehicle (for example, steps S212 and S221), and when identifying the predetermined situation, calculates information related to the behavior of the driver for reducing the risk as the feature (for example, steps S222 to S234).

Accordingly, when a predetermined situation in which a risk occurs in relation to the preceding vehicle is identified, information related to the behavior of the driver for reducing the risk is calculated as the feature, and the feature is transmitted to the outside. As a result, the driving of the driver can be evaluated when a risk occurs in relation to the preceding vehicle.

(2) As shown in step S221 in FIG. 5, the predetermined situation may be a situation in which the inter-vehicle time is shorter than a predetermined time (for example, 2.5 seconds) (for example, a scene changing from 0b00 to 0b01). The inter-vehicle time is obtained by dividing the inter-vehicle distance from the preceding vehicle by a velocity related to the host vehicle (which may be, for example, the relative velocity between the host vehicle and the preceding vehicle or the velocity of the host vehicle).

Accordingly, when a situation in which the inter-vehicle time obtained by dividing the inter-vehicle distance from the preceding vehicle by the velocity related to the host vehicle is shorter than a predetermined time is identified, information related to the behavior of the driver for reducing the risk is calculated as the feature, and the feature is transmitted to the outside. As a result, the driving of the driver can be evaluated when a risk occurs in relation to the preceding vehicle.

(3) As shown in FIGS. 3 and 5, the information related to the behavior of the driver for reducing the risk may be information related to the braking operation (for example, the first feature obtained by dividing the number of times Nb the behavior of placing the foot on the brake pedal has been performed by the total number Ns of sampled scenes, and the second feature that is the difference between the first feature and the skilled driver's feature). Accordingly, when a predetermined situation in which a risk occurs in relation to the preceding vehicle is identified, information related to the braking operation is calculated as the feature, and the feature is transmitted to the outside. As a result, the driving of the driver can be evaluated when a risk occurs in relation to the preceding vehicle.

(4) As shown in FIGS. 3 and 5, the information related to the braking operation may be information related to the sensor value related to the braking operation.

Accordingly, when a predetermined situation in which a risk occurs in relation to the preceding vehicle is identified, information related to the sensor value related to the braking operation is calculated as the feature, and the feature is transmitted to the outside. As a result, the driving of the driver can be evaluated when a risk occurs in relation to the preceding vehicle.

(5) As shown in FIGS. 3 and 5, the CPU of the brake ECU 20 may calculate as the feature the information related to the number of times the behavior of the driver for reducing the risk has been performed in the predetermined situation (for example, the first feature obtained by the number of times Nb the behavior of placing the foot on the brake pedal has been performed/the total number Ns of sampled scenes, and the second feature that is the difference between the first feature and the skilled driver's feature). Accordingly, when a predetermined situation in which a risk occurs in relation to the preceding vehicle is identified, information related to the number of times the behavior of the driver for reducing the risk has been performed in the predetermined situation is calculated as the feature, and the feature is transmitted to the outside. As a result, the driving of the driver can be evaluated when a risk occurs in relation to the preceding vehicle.

(6) As shown in FIGS. 3 and 5, the CPU of the brake ECU 20 may calculate as the feature the information related to the difference between the behavior of the driver for reducing the risk and the predetermined model behavior (for example, the second feature that is the difference between the first feature obtained by the number of times Nb the behavior of placing the foot on the brake pedal has been performed/the total number Ns of sampled scenes and the skilled driver's feature).

Accordingly, when a predetermined situation in which a risk occurs in relation to the preceding vehicle is identified, information related to the difference between the behavior of the driver for reducing the risk and the model behavior is calculated as the feature, and the feature is transmitted to the outside. As a result, the driving of the driver can be evaluated when a risk occurs in relation to the preceding vehicle.

The embodiment disclosed herein should be construed as illustrative in all respects and not restrictive. The scope of the present disclosure is shown by the claims rather than by the above description of the embodiment and is intended to include all modifications within the scope equivalent to the claims.

What is claimed is:

1. An information processing device configured to calculate a feature related to driving of a driver, the information processing device comprising:

one or more processors configured to calculate the feature;

a reception unit configured to receive input information including at least one of information on driving operation of a vehicle, information on an operating state of driver assistance of the vehicle, and information on a behavior of the vehicle; and a transmission unit configured to transmit the calculated feature to an outside server, wherein the one or more processors are configured to:

monitor an inter-vehicle time obtained by dividing an inter-vehicle distance from a preceding vehicle by a velocity related to a host vehicle;

detect a change of the inter-vehicle time from being within a first predetermined range to being in a second, shorter predetermined range;

identify, based on the detected change, that a predetermined situation in which a risk in relation to the preceding vehicle occurs, the predetermined situation occurring when the inter-vehicle time has reduced into the second range and continuing to occur only while the inter-vehicle time remains in the second range; and upon a determination that the predetermined situation is identified, calculate, as the feature, information related to a behavior of the driver for reducing the risk in the predetermined situation, the calculation being performed using only the input information received during a period beginning after the detected change of the inter-vehicle time into the second range and continuing while the inter-vehicle time remains in the second range.

2. The information processing device according to claim 1, wherein the information related to the behavior of the driver for reducing the risk is information related to braking operation.

3. The information processing device according to claim 2, wherein the information related to the braking operation is information related to a sensor value related to the braking operation.

4. The information processing device according to claim 1, wherein the one or more processors are configured to calculate, as the feature, information related to a frequency with which the behavior of the driver for reducing the risk has been performed in the predetermined situation.

5. The information processing device according to claim 1, wherein the one or more processors are configured to calculate, as the feature, information related to a difference between the behavior of the driver for reducing the risk and a predetermined model behavior.

6. A vehicle including an information processing device configured to calculate a feature related to driving of a driver, wherein:

the information processing device includes one or more processors configured to calculate the feature;

a reception unit configured to receive input information including at least one of information on driving operation of a vehicle, information on an operating state of driver assistance of the vehicle, and information on a behavior of the vehicle; and a transmission unit configured to transmit the calculated feature to an outside server; and the one or more processors are configured to:

monitor an inter-vehicle time obtained by dividing an inter-vehicle distance from a preceding vehicle by a velocity related to a host vehicle;

detect a change of the inter-vehicle time from being within a first predetermined range to being in a second, shorter predetermined range;

identify, based on the detected change, that a predetermined situation in which a risk in relation to the preceding vehicle occurs, the predetermined situation occurring when the inter-vehicle time has reduced into the second range and continuing to occur only while the inter-vehicle time remains in the second range; and upon a determination that the predetermined situation is identified, calculate, as the feature, information related to a behavior of the driver for reducing the risk in the predetermined situation, the calculation being performed using only the input information received during a period beginning after the detected change of the inter-vehicle time into the second range and continuing while the inter-vehicle time remains in the second range.

7. An information processing system including a vehicle and an outside server, the vehicle including an information processing device configured to calculate a feature related to driving of a driver, wherein:

the information processing device includes one or more processors configured to calculate the feature;

a reception unit configured to receive input information including at least one of information on driving operation of a vehicle, information on an operating state of driver assistance of the vehicle, and information on a behavior of the vehicle; and a transmission unit configured to transmit the calculated feature to an outside server; and the one or more processors are configured to:

monitor an inter-vehicle time obtained by dividing an inter-vehicle distance from a preceding vehicle by a velocity related to a host vehicle;

detect a change of the inter-vehicle time from being within a first predetermined range to being in a second, shorter predetermined range;

identify, based on the detected change, that a predetermined situation in which a risk in relation to the preceding vehicle occurs, the predetermined situation occurring when the inter-vehicle time has reduced into the second range and continuing to occur only while the inter-vehicle time remains in the second range; and upon a determination that the predetermined situation is identified, calculate, as the feature, information related to a behavior of the driver for reducing the risk in the predetermined situation, the calculation being performed using only the input information received during a period beginning after the detected change of the inter-vehicle time into the second range and continuing while the inter-vehicle time remains in the second range; and the outside server is configured to execute a predetermined process on the calculated feature.

* * * * *